A. SMALL.
Car Wheel.
No. 4,882.
Patented Dec. 10, 1846.
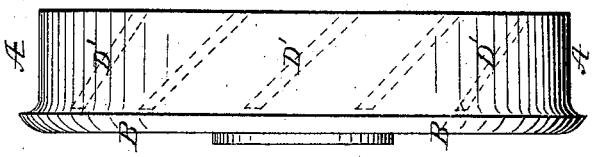
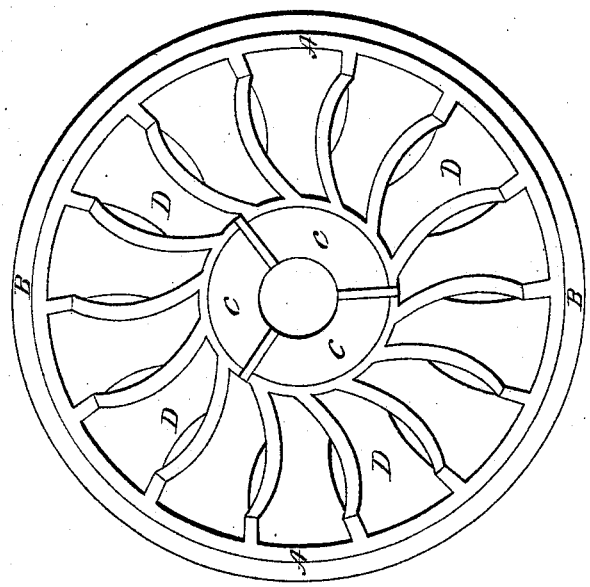

UNITED STATES PATENT OFFICE.

ALEXANDER SMALL, OF YORK, PENNSYLVANIA.

CAR-WHEEL.

Specification of Letters Patent No. 4,882, dated December 10, 1846.

*To all whom it may concern:*

Be it known that I, ALEXANDER SMALL, of the borough of York, in the county of York and State of Pennsylvania, have invented a new and useful Improvement in the Manner of Constructing Cast-Iron Wheels for Locomotive-Engines, Cars, and other Vehicles Used on Railroads; and I do hereby declare that the following is a full and exact description thereof.

The rim, and tread of my wheels may be like those in ordinary use, and said rim is to be connected with the hub, or nave, by means of spokes extending from one to the other; the hub, also, is divided into three parts for the purpose of allowing for contraction, as usual.

My improvement consists in the manner in which I arrange the spokes. These instead of standing with their planes, or sides in the direction of the axis of the wheels, I place obliquely, so that they shall overlap each other like the slats of a window blind, in such manner as that a direct transverse section across the rim cannot be made without cutting the ends of one or two of the spokes. A wheel thus constructed it is extremely difficult to break through the rim when it is desired so to do, a force many times greater than that required to break across the rim of a wheel of any of the usual constructions being required for that purpose; and it is confidently believed, from experiments that have been made, that such a wheel would never be broken in its ordinary use on a road.

In the accompanying drawing Figure 1, is a view of the outer face of my wheel, and Fig. 2, an edge view of it.

A, A, is its rim, and B, B, its flanch. C, C, C, is the divided hub.

D, D, D, are the spokes, placed obliquely so as to overlap each other; the manner in which these are arranged as they join the rim of the wheel is shown by the dotted lines D′, D′, Fig. 2.

Having thus fully described the nature of my improvement in the wheels for locomotive engines, cars, and other carriages used on rail-roads, what I claim therein as new, and desire to secure by Letters Patent, is—

The placing of the spokes of such wheels at such an angle with the plane of the wheel as that they shall overlap each other in the manner herein described and represented, whereby a sustaining power is applied to the rim of the wheel by which its cross fracture is rendered so difficult as to insure its safety under all ordinary usage.

ALEX. SMALL.

Witnesses:
    THOS. P. JONES,
    EDWIN L. BRUNDAGE.